Figure 1:
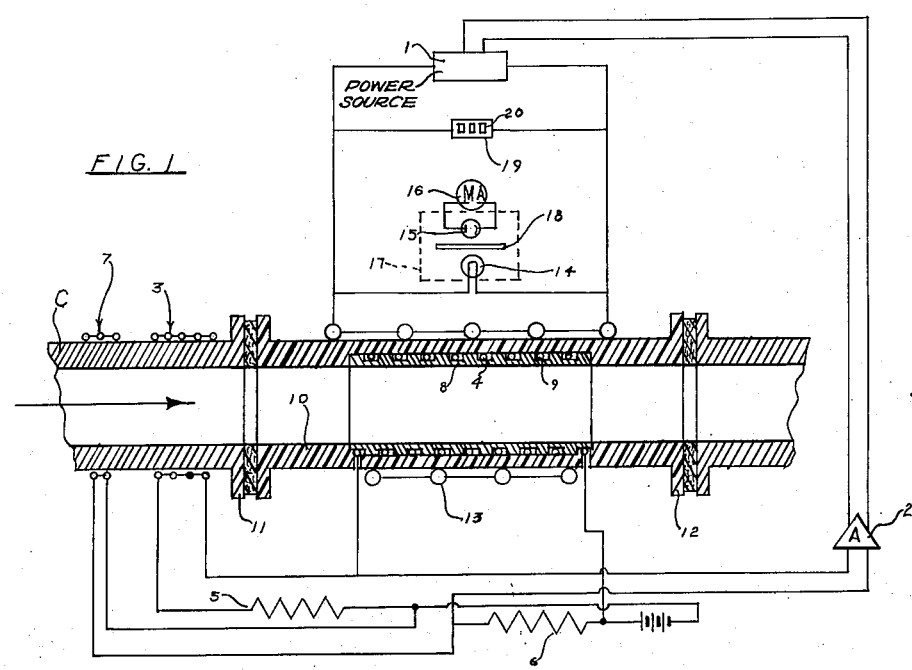

Feb. 28, 1961   J. H. LAUB   2,972,885
FLOW METER

Filed Sept. 24, 1954   2 Sheets-Sheet 1

INVENTOR
JOHN HARRY LAUB
BY
ATTORNEY

Feb. 28, 1961 J. H. LAUB 2,972,885
FLOW METER
Filed Sept. 24, 1954 2 Sheets-Sheet 2
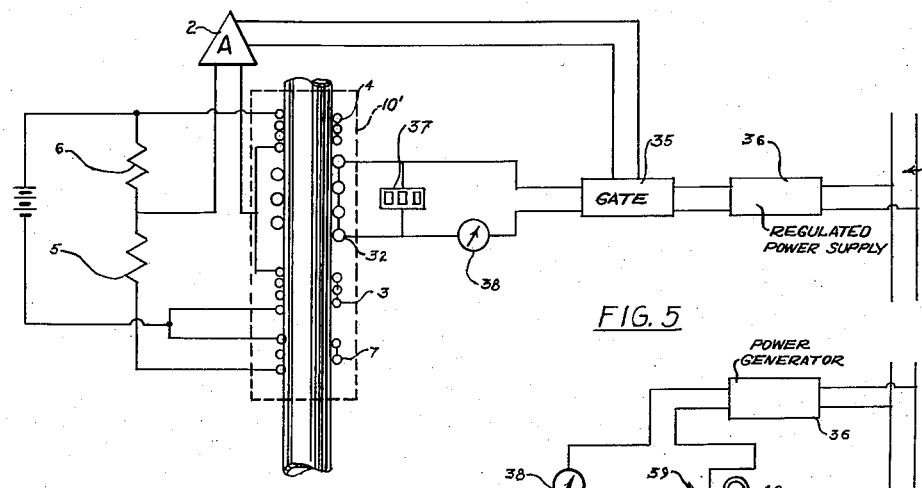
FIG. 5
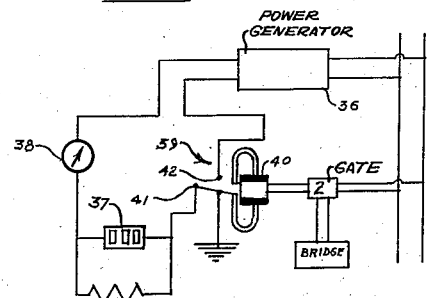
FIG. 6
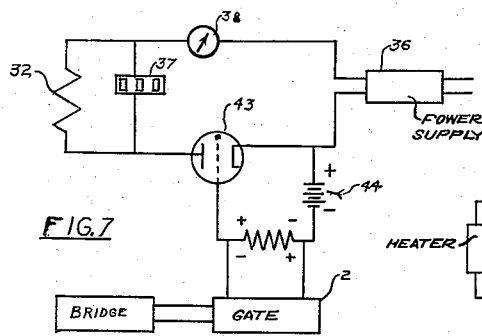
FIG. 7
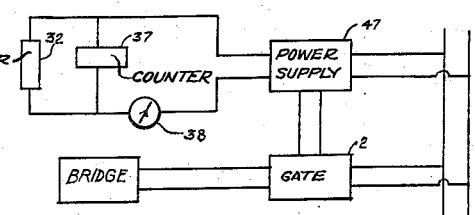
FIG. 9
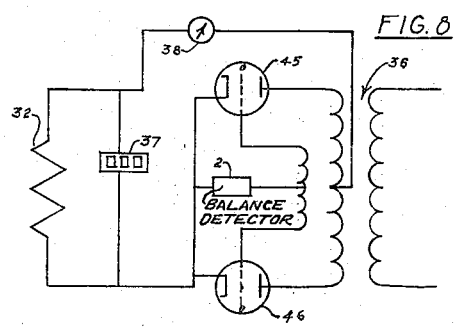
FIG. 7A
FIG. 8
INVENTOR
JOHN HARRY LAUB
BY
*Walter F. Gilbert*
ATTORNEY

United States Patent Office 2,972,885
Patented Feb. 28, 1961

2,972,885
FLOW METER

John Harry Laub, 331 Forest Drive, Short Hills, N.J.

Filed Sept. 24, 1954, Ser. No. 458,209

12 Claims. (Cl. 73—204)

This invention deals with flow meters, especially with devices for measuring the rate or quantity of flow of a liquid, gas, or other medium flowing through a conduit, and is more particularly concerned with electro-caloric type flow meters.

Flow meters as commonly used for liquids and gases are based on mechanical principles such as the measurement of the displacement of an element in which the confined flowing fluid causes such element (e.g. a nutating piston, propeller or vane) to rotate, the number of revolutions, or the deflection of the vane, being a measure of the quantity of medium flowing through the conduit or pipe line; or on pressure drop occurring in the confined flowing medium passing through a Venturi tube or through an orifice, the pressure drop being a measure of the rate of flow.

The devices of the prior art suffer, however, from a number of shortcomings. The mechanical means injected into the flowing medium affect the free flow thereof, increase the pressure drop across the meter and are exposed to contamination and mechanical and chemical attack by the fluid. Great care must be exercised in their construction, often without success, in order to avoid leakage of the medium, e.g. gasoline, ether, chlorine, etc., which may be inflammable, corrosive or otherwise objectionable, and such avoidance of leakage is particularly difficult in meters of the volumetric displacement type where the rotary movement of the displacement element must be transmitted through the housing of the meter by mechanically moving parts. Furthermore, such devices are not always accurate, especially where the flow rate may vary from time to time over a wide range, i.e. from a low minimum to a high maximum. Such flow meters are of the direct indicating type and require, where remote indication is desired, special auxiliary devices, e.g. magnetic plungers, electric tachometers, etc., for remote indication. Pressure drop type meters furthermore have a limited range and require special devices, e.g. desquaring devices for conversion of the square-root scale characteristic of such meters into a linear scale characteristic. Also flow meters as heretofore known are usually designed for only one purpose and are normally not capable of measuring the rate of flow as well as the total quantity of flow.

Furthermore, it is difficult, if not impossible, to design meters of conventional type to meet the very stringent specifications required by the sanitary standards established for equipment used in certain industries, e.g. in dairies for the measurement of the flow of milk, or in canning factories to measure fruit juices, and also in pharmaceutical plants for the measurement of biologics. In such applications, any obstruction to the free flow of the flowing medium, such as orifices, bearings, propellers, vanes, etc., are objectionable because they are difficult to keep clean, and may cause contamination of the fluid.

There are also known to exist flowmeters operating on the electrocaloric principle or of the "Thomas" type, in which the flow is measured by the determination of the effect of a known amount of heat dissipated into a flowing medium. Electrocaloric flow meters have been proposed heretofore which are capable of direct as well as remote indication without the use of auxiliary devices to convert mechanical into electrical values. However, such instruments have exhibited various shortcomings, e.g. failure to record accurately small or fast changes in flow, due to thermal time lags inherent in their structure. Also, the prior known instruments operating on this principle have proved to be commercially unacceptable especially in the measurement of the flow of liquids in that errors in measurement due to fluctuations in fluid temperature, thermal time lags, etc. have not been overcome. It is of particular importance that an electrocaloric flow meter record changes in flow rapidly, and that heat be transmitted to the fluid or discontinued as the needs of the instrument require for accurate readings.

Electrocaloric type flowmeters as heretofore proposed have exhibited the same shortcoming regarding the exposure of the measuring elements to the fluid with the attendant risk of contamination, corrosion, leakage, etc. as have mechanical type flowmeters. Furthermore, the power requirement for such electrocaloric flowmeters was excessive and led to objectionable overall time lag, because of the size and the dimensions of the circuit elements required for the handling of the large power necessary to elevate the temperature of the entire core of the flowing medium.

Figure 4:
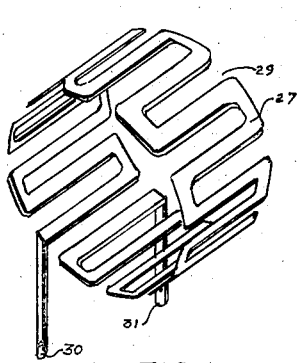
Figure 2:
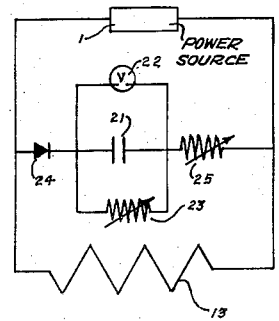
Figure 3:
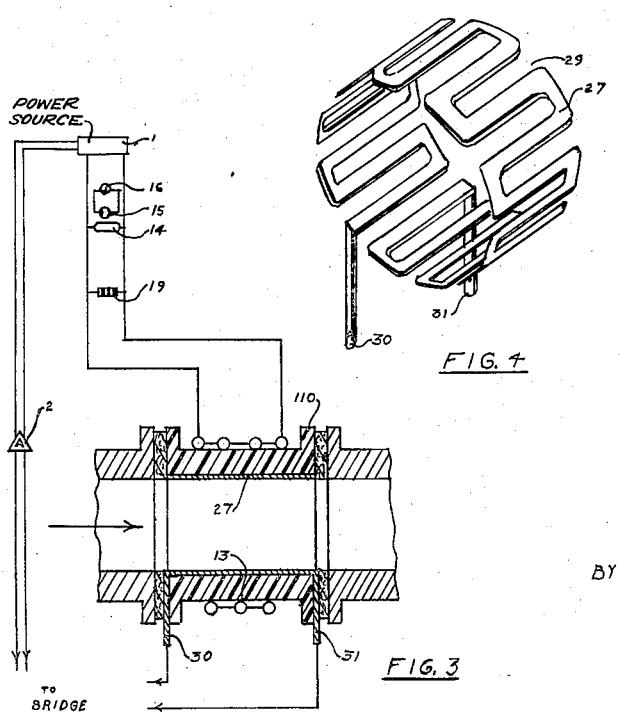

It therefore is one object of this invention to overcome such shortcomings of flow meters as heretofore known, and to provide an electrocaloric type flow meter which shall be vibration and leak proof and incapable of interfering with the free flow of the confined gaseous or liquid medium and which shall give accurate and rapid readings. It is a still further object of this invention to provide an electrocaloric type flow meter in connection with the measuring of the flow of fluids which is accurate within a wide range of temperatures and supply voltages, and which requires low operating power. It is another object of this invention to provide a flow meter capable of measuring the rate of flow of a flowing medium as well as the total quantity of flow thereof with a minimum overall time lag. It is another object of this invention to provide a flow meter which can be easily cleaned and which meets the stringent sanitary requirements in the food and pharmaceutical industries. A further object of the invention is to provide a flowmeter which utilizes the rate of heat transfer through the walls of a conduit and the boundary layer of the fluid as a measure of the mass rate of flow. Another object of the invention is to provide a flowmeter operating on the electrocaloric-boundary layer principle herein described, the power supply to the heater of which is monitored by an electronic gating circuit which transmits a series of predetermined quantities of power, alternating between full-on and full-off. Other objects and advantages of my invention will appear from the description thereof hereinafter following. The nature of the flow meter of the invention and its functioning are illustrated in the accompanying drawings, forming a part hereof, in which:

Figure 1 represents a schematic illustration of one embodiment of the flow meter of the invention, Figure 2 represents a schematic illustration of a modification of the embodiment of the flow meter of the invention shown in Figure 1, with some of the elements common thereto being omitted for the sake of clarity, Figure 3 is a figure similar to Figure 2, which shows in schematic form a further modification of the embodiment of the flow meter of the invention shown in Figure 1, Figure 4 is a perspective view of the combined heater sleeve and resistance thermometer of the embodiment shown in Figure 3, Figure 5 is a schematic illustration of a further embodiment of the flow meter of the invention employing a gate between the power supply and the heat exchanging means, Figure 6 is a schematic representation of the embodiment shown in Figure 5, in which a gate of the electromagnetic type is employed, Figure 7 is a schematic representation of the embodiment shown in Figure 5, in which a gate of the electronic type is employed, Figure 7A is another schematic representation of the embodiment shown in Figure 5, in which another electronic type gate is employed, Figure 8 is a schematic representation of the embodiment shown in Figure 5, in which the gate is replaced in function by other electronic means, and Figure 9 is a block diagram illustrating a direct triggering of power input by the unbalance signal of the bridge.

The flow meter of the invention involves the use of a heat exchanger in which a heating means constitutes one element, and the flowing medium constitutes the other element, heat being transferred to the flowing medium and the temperature increase or decrease occurring in the flowing medium being measured with respect to a known reference temperature of the flowing medium before passing through the heat exchanger. The transmission of heat to the flowing medium in the instrument of the invention primarily affects the boundary layer within the conduit, i.e. the fluid flowing next adjacent the walls of the conduit. Thus, the instrument is constructed so as to rapidly measure the temperature elevation of the boundary layer of fluid and thereby the flow in the conduit. The flow meter of the invention also provides means for readily transforming and calibrating such temperature increase or decrease in terms of rate of flow of the flowing medium or in terms of quantity of flowing medium, and further includes means for adjusting or compensating for certain errors which might otherwise affect the accuracy of the functioning of the device of the invention.

In Figure 1, I have shown a conduit or pipe C through which the liquid or gaseous medium flows. This conduit or pipe line C contains a pipe section 10 of non-metallic material suitable for carrying the fluid whose flow rate is to be measured, e.g. glass, stoneware, silica, Bakelite, or some other plastics material. Heat is transferred to the flowing medium by means of an induction coil 13 wound on the outside of a portion of the section 10. This coil 13 may be formed of a few turns of copper tubing. A temperature responsive resistance element 4 consisting of a coil of thermo-responsive wire or ribbon is wound on the outside of a metal sleeve 8 and may be embedded in grooves 9 cut into the outside of sleeve 8. The sleeve may be made of a thin gauge metal, e.g. of nickel, Monel, tantalum, stainless steel or any other material suitable for heating in a high frequency field as a result of eddy currents induced in it by the field. Sleeve 8 is fitted into a recessed portion of the tube section 10. The sleeve 8 together with coil 13 are hereinafter referred to as the "heating means."

The meter in this embodiment operates from a high frequency power source 1, which may consist of a radio frequency generator of conventional type or an oscillator employing grid controlled tubes filled with a rare gas or mercury vapor (thyratrons) which are capable of producing relaxation type oscillations in a well known manner, for example, by periodically charging and discharging a condenser through thyratrons. Since such a source is per se well known, a discussion of the details thereof is omitted and such unit is represented by a blank box as shown in Figure 1.

The output from power source 1 is controlled by the output voltage of an amplifier 2, which may be a conventional vacuum tube amplifier, a magnetic amplifier or an amplifier using transistors, or any combination of these. Again, the unit 2 is represented by a blank box as is the unit 1.

The output of power source 1 is either full on or full off, i.e. the output represents pulses of high frequency energy of constant amplitude. The power of the oscillator is turned on as soon as the output voltage of the amplifier 2 exceeds a predetermined minimum value for which purpose a bias voltage may be used in the grid circuit of the R.F. oscillator 1. The bias voltage keeps the grids of the oscillator tubes at a potential which is sufficiently negative with respect to the cathodes to keep the tubes from oscillating as long as the bridge (described hereinafter) is in balance and does not produce a signal. However, if the rate of flow increases, the hereinafter described bridge becomes unbalanced and a signal appears across its diagonal of a polarity (in the case of a D.C. operated bridge) or a phase (in the case of a bridge operating on A.C.) which will render the grid potential positive and allow the oscillations to start. As a result, power will flow into the heat exchanger until the balance of the bridge has been restored, and the output signal disappears, thereby blocking the tubes from oscillating. It should be noted that in the case of a lowering of the flow rate, the bridge also becomes unbalanced, however, the polarity or phase of the signal voltage across its diagonal is of such character as to render the grids more negative to prevent the tubes from oscillating. No power is therefore released to the heat exchanger until the flow rate has reached its new, lower, steady state value.

The input to the amplifier 2 is taken from the output voltage of the abovementioned bridge which consists of the downstream resistance thermometer 4, an upstream temperature responsive resistance element 3 (similar in construction to coil 4) and fixed resistances 5 and 6. If desired, a temperature responsive resistance coil 7, may be added to one fixed resistance arm, e.g. resistance 5, for the purpose of temperature compensation, as described more fully hereinafter. Coils 3 and 7 may be protected against ambient temperature effects by simply enclosing them in a tubular housing (not shown) if desired, and are in intimate thermal contact with the conduit C. The temperature responsive resistance elements 3 and 4 may be of the usual type involving coils of wire or ribbon constructed of a material the temperature coefficient of electrical resistance of which is high and reproducible, e.g. platinum or alloys of precious metal or nickel.

The difference in boundary layer temperature between that of the flowing medium before reaching the heat exchanger means, including coil 13 and sleeve 8, and that of the flowing medium after heat is transmitted thereto is used to cause unbalance of the bridge.

If the high frequency power source, e.g. and R.F. oscillator is triggered to the "on" position by a signal from the bridge diagonal, as a result of an increase in flow rate, it will release a high frequency pulse into the coil 13 and the electro-magnetic field created by the high frequency current in coil 13 will induce eddy currents in sleeve 8, thereby heating it and the temperature responsive resistance element 4. As a result of this, the resistance of element 4 will increase until the balance of the bridge is restored and the signal from the bridge has ceased, restoring the R.F. oscillator to the "off" position by grid control. The R.F. oscillator 1 therefore delivers to the coil 13 a quantized intermittent flow of high frequency pulses, i.e. more frequently when the flow rate is high and more heat is required to keep the bridge in balance and less frequently when the flow rate is low and less heat is required for keeping the bridge in balance.

If desired, the average pulse energy, i.e. the wattage input to the high frequency coil 13, could be measured by a wattmeter located in the R.F. circuit between the source 1 and the coil 13, and a watthour meter may be used additionally to totalize the flow, in the manner as described in my copending application Serial No. 329,899, filed on January 6, 1953, now Patent No. 2,729,976. However, since wattmeters and watthour meters of a design suitable for accurate measurement of the high frequency pulse energy may not be available, the method illustrated in Figure 1 is preferred since it is especially suited for high frequency measurements. This "measuring means" includes a lamp 14, connected across the terminals of the high frequency coil 13, which, being connected in parallel to the coil 13, will be energized by the high frequency pulses from the power source 1 and which therefore will emit more light for high flow rates and less light for low flow rates. The lamp 14 may be of the incandescent type having a filament of tungsten wire in a vacuum or in an atmosphere of gases or it may be of the gaseous discharge type such as fluorescent lamps or gaseous discharge flash lamps with an envelope of glass, fused quartz, etc. either in straight, tubular or helical form.

The radiation output of lamp 14 is measured by a photocell 15, by means of a milliammeter or millivoltmeter 16. The photocell 15 may be either of the barrier-layer type or a vacuum type, with or without gas filling, or a photomultiplier tube may be used if desired, the photocell 15 and the light source 14 may be enclosed in a joint housing 17 which is opaque to outside radiation. A filter 18 or combination of filters may be interposed between light source 14 and photocell 15, if desired, to select certain ranges of the spectral output of light source 14, i.e. the infra-red range or the ultra-violet range, or certain ranges of the visible spectrum in order to match the spectral response characteristics of the particular photocell.

In addition, a motor driven or pulse-counter 19 is connected in parallel with the high frequency coil 13, and has suitable dials 20 which register the "on" time of the power source, and therefore if the amplitude of the latter is kept constant, it records the totalized flow.

All component parts entering into the measurement of the rate of flow of the flowing medium are located outside the conduit containing the flowing medium, and there are no stationary or movable parts inserted into the flowing medium itself. There is, therefore, no obstruction which might stop or impede the flow, create a pressure drop, or in any way interfere with the free flow of the liquid or other medium involved. The circuit elements employed for carrying the electrical current are separated from the flowing medium by the walls of the conduit, thus avoiding any possibility of ignition, explosion, or contamination of the medium. There are no obnoxious or toxic fumes which might otherwise escape from the conduit or pipe line, and the meter can be easily cleaned.

Whereas in the embodiment shown in Figure 1 only the amplitude of the high frequency pulses was kept constant, it is possible to so design the power source, i.e. R.F. oscillator, that the duration of each individual pulse is kept constant as well as the amplitude. In Figure 2 there is shown such an arrangement wherein again the source 1 may consist of a high frequency generating circuit employing grid control vacuum tubes, or a circuit capable of producing relaxation type oscillations or a magnetron or klystron tube of the type commonly used in radar circuits for the generation of pulses, as is per se well known to those skilled in the art. A great variety of circuits and circuit arrangements is available and well-known in the art, obviating the necessity of a detailed description herein. The sequence of high frequency pulses thus produced for a change from a low flow rate to a high flow rate shows in increasing pulse frequency, i.e. each pulse has the same amplitude and the same duration but the time interval between the individual pulses varies with the flow rate and becomes smaller as the flow rate increases. It is obvious, therefore, from a consideration of the previous disclosure that since the frequency of these pulses is a direct measure of the flow rate it can be measured conveniently by well-known pulse frequency measuring methods. Figure 2 illustrates the employment of a method for measuring the pulse frequency of the power source in my device. The charge of a condenser 21 is measured by means of a voltmeter 22 connected across it and an adjustable leakage resistor 23 in parallel for controlling the "bleed" of the condenser during discharge periods. Connected in series with this combination is a small rectifier 24 which may be a vacuum tube rectifier, a gas filled rectifier or preferably a rectifier of the semiconductor diode type which serves to rectify the high frequency pulses so that condenser 21 is charged with a fixed polarity. An adjustable resistor 25 may be used additionally in series to control the rate of charging of condenser 21.

The instrument as thus far described may exhibit a small time lag between the time of a change in the flow rate and its indication by the indicating instrument due to the time required for heat to flow from the sleeve 8 in Figure 1 to the temperature responsive resistance element 4, through the necessary electrical insulation between the two. Such insulation may consist of a layer of varnish or some insulating material surrounding the wire such as silicone, glass fiber, etc. Thus, although the instrument largely eliminates the time lag, a delay of a few seconds may arise due to the time required for heat to pass through the insulation, and this may be objectionable. This small delay can be completely eliminated by an arrangement shown in Figure 3, in which the R.F. heated sleeve and the temperature responsive resistance element are combined in the same element 27. The element 27 as more clearly shown in Figure 4 consists of a thin walled sleeve of a material suitable for high frequency heating and having a high and reproducible temperature coefficient of electrical resistance, preferably nickel or platinum, which is meander shaped and either molded into or otherwise fitted to the inside wall of the section 110 (which is similar in construction to the tube 10 of Figure 1). The meander shaped sleeve 27 can, for example, be manufactured by simply sawing slots 29 into a cylindrical tube of nickel, platinum, etc. The overall resistance of this sleeve-resistance thermometer between its terminals 30 and 31 can then be conveniently adjusted by varying the length or width of the slots 29 by sawing, filing, etc. Alternatively the meander shaped sleeve can be formed by the well known printed circuit technique, i.e. the inner surface of the tube 110 can have the meander shaped temperature responsive resistance element imprinted thereon. Such imprinting can be done simply by painting the desired circuit pattern with electrically conductive paint; or the photo method can be used, whereby the interior of the tube 110 is coated with a photosensitive material and the original of the wiring diagram is used as a negative through which light is projected onto the coated insulating material. After development, an etching process is then applied which finally results in a printed circuit pattern image of the required shape and resistivity on the inside of the tube. Such printed circuit technique is assumed to be well known and for the purposes of the disclosure of this invention further information need not be given, detailed directions being readily available among current literature. If so desired, the printed circuit technique can be used for all the elements of the circuit, e.g. heater coil 13, temperature responsive resistance element 3, and coil 7.

The sleeve 27 forms one arm of a bridge, the other arms consisting of the standard thermometer 3 and fixed resistances 5 and 6 all as described in connection with Figure 1. In Figure 3, the rate of flow is shown to be indicated by measuring the light output of the gaseous discharge lamp 14, which is connected in parallel with the induction coil 13, by means of a photocell 15, and measuring the output of the latter by the milliammeter 16. Alternatively, the rate of flow may be indicated by the output of a small thermocouple, preferably enclosed in an evacuated envelope, and connected in parallel with the induction coil 13, or by some other method to indicate high frequency pulse wattages, which method is per se well known in the art. The integrated flow is again registered by the counter 19 which measures the "on" time of the power pulses.

As indicated in my aforementioned copending application, varying fluid temperatures may affect the accuracy of flow measurements. Such varying fluid temperature effects a change in the specific heat of the flowing medium and the viscosity thereof. This affects the character of the flow and the mechanism of the heat transfer between the coils and the fluid. The instrument disclosed herein operates on the heat transfer to the boundary layer of the fluid, which effects a very substantial saving of power input to the heater coil. Nevertheless, even though only the boundary layer is affected and is used as the measured object, a small temperature change in the fluid can still cause an inaccuracy in readings. Such errors, and other errors due to unknown transient conditions which depend upon temperature variations, can be compensated for by making one of the fixed resistance arms slightly sensitive to temperature as by adding thereto a small section of a wire coil 7 of nickel or other temperature sensitive material whose resistance increases with increase in temperature. The coil 7 is wound on the conduit C so as to be responsive to and subject to its temperature, whereby the balance of the Wheatstone bridge is shifted with changes in the temperature of the flowing medium before it reaches the heat exchanger portion of the meter, and therefore an unbalance of the bridge which causes a pulse input to the heater occurs only as the result of a change in the rate of flow of the flowing medium.

The embodiments of the invention described above have the common feature of controlling the flow of energy to the heat exchanging means of the flowmeter in quantized form by means of a trigger action on the power source directly. However, this trigger action can be imposed indirectly on the input power to the heating means by employing a gate. The trigger action is initiated by the unbalance signal of the sensing circuit of the flowmeter and applied to the gate, after amplification if necessary, which acts as a switch for the proper source. The employment of a gate in controlling the input to the heat exchanger results in an arrangement which is faster responding, simpler in operation and less expensive than the prior device disclosed in my abovementioned copending application.

Figure 5 illustrates an embodiment of my invention in which gate control is used in controlling the supply to a heater coil of a thermal flowmeter operating on a standard power supply of A.C. or D.C. The heater coil 32 is wound in intimate thermal contact on the outside of the flow conduit. The coil 32 is connected to the power supply 34 over a gate 35 and a constant voltage transformer or similar regulated power supply 36, which keeps the voltage independent, within narrow tolerances, of fluctuations in the primary supply lines 34. In a similar manner to that shown in Figure 1 the sensing circuit of the flowmeter consists of a Wheatstone bridge with the upstream temperature responsive resistance element 3 and the downstream temperature responsive resistance element 4, a temperature responsive resistance coil 7 for temperature compensating purposes and ratio arms 5 and 6. Connected across the diagonal of the bridge is the balance detector 2, which may consist of a vacuum tube amplifier, a magnetic amplifier, a transistor amplifier or a combination of these. Unbalance of the bridge is detected and amplified in detector 2 and transmitted to gate 35 as a triggering signal.

The gate 35 operates essentially as a switch to turn the power on and off. It may be of the electronic or electromagnetic type. The power to the heater coil 32 is turned on in response to an unbalance signal of the proper polarity (as in the case of a D.C. bridge) or of the proper phase (as in the case of an A.C. bridge), and remains on until balance of the bridge is restored and the unbalance signal disappears, thereby returning the gate to its off position, i.e. power interrupting condition. The power then remains off until a further unbalance of the bridge occurs to be detected and amplified to a triggering signal for the gate.

The power to the heater coil flows in the form of discrete quanta or pulses, the frequency and duration of these pulses of power depending upon the rate of flow of the fluid in the transmitter conduit. The frequency and duration increase as the flow rate increases. The time during which the power is on can be registered by a counter 37, which is either of the electromagnetic or electronic type, and thus is a means of measuring the total or integrated flow. The rate of flow can be measured by a wattmeter 38 indicating the wattage input to the heater 32. Alternatively, the flow rate measuring methods of Figs. 1 and 3 can be used.

Figure 6 shows an example of the use of a gate of the electromagnetic type, in which the relay 39 switches the power to the heater coil 32 on or off. The relay includes a solenoid coil 40 which is energized by a trigger signal from the balance detector 2. As long as the contacts 41 and 42 are closed in the relay, the power flows from the supply lines into the heater coil 32 and is counted by counter 37, which totalizes the flow. The rate of flow is registered by the wattmeter 38. When the bridge is balanced and no triggering signal is produced the contacts 41 and 42 remain open and the power input to the heater is interrupted. As in Figure 5, the possible variations of the supply voltage can be controlled if they exceed a predetermined limit by means of a regulated power supply which keeps the amplitude of each power pulse constant, e.g. a constant voltage transformer 36 connected into the A.C. supply line. The relay 39 is preferably of the polarized type, in which case it responds by closing the contacts 41 and 42 only if the unbalance signal is of the correct phase or polarity, i.e. if more power is required to restore the balance of the bridge. When less power is demanded to restore the balance of the bridge, the contacts remain open due to the wrong polarity or wrong phase of the bridge signal. It is also possible, however, to use a non-polarized relay if signals of the wrong polarity or wrong phase are either suppressed by the balance detector itself or by rectification or phase discrimination of the bridge signal. Such rectification or phase discrimination is accomplished by devices which are per se well known to those skilled in the art and which are located between the balance detector and the relay.

Although a gate of the electromagnetic type as shown in Figure 6 is a very satisfactory one and is inexpensive for many applications of the flowmeter of the invention, there are problems which are best solved by the use of electronic gates which have the advantage of greater sensitivity and lower time lags, and which do not employ mechanical contacts. Such an electronic gate may comprise multi-electrode vacuum tubes, e.g. triodes or pentodes, or grid controlled gaseous discharge tubes, e.g. thyratrons, ignitrons, etc., with an atmosphere of mercury vapor, or preferably, an inert gas, or hydrogen. Such devices lend themselves readily for use as a gate in my instrument since their plate current changes from zero or a very low value to a high value if the grid voltage with respect to the cathode swings from a negative to a positive value.

Such an electronic gate flowmeter circuit is shown in Figure 7. The thyratron 43 is connected between the regulated power supply 36 and the heater coil 32 (which is similar in construction to the coil shown in the previous figures) and allows the heater to be energized with half wave current pulses of constant amplitude but of varying frequency. The pulses of energy occur as long as the grid of the thyratron is positive with respect to the cathode as a result of an unbalance signal from the bridge which is amplified by balance detector and amplifier 2. The positive voltage which is fed to the thyratron grid may be a D.C. voltage which is produced in a balance detector of the duo-directional type (cf. Chapters 5, 8, 9, 12, 13, 14 of Magnetic Amplifier Circuits by W. A. Geyger, 1954 edition, McGraw-Hill Book Co.), and is superimposed upon a negative bias voltage between grid and cathode as shown at 44. When the unbalance signal disappears because the bridge is in balance or becomes negative because less power is required to restore balance, the thyratron 43 becomes non-conductive and interrupts the power input to the heater 32. The response of the thyratron tube 43 to an unbalance signal is very fast, and is practically instantaneous, which greatly assists in obtaining a high degree of accuracy, a reduction of time lag and elimination of hunting. The energy input to the heater can be quantized as low as one half cycle or even less of the available power supply, which results in very fine and accurate control of the heater wattage.

An even more sensitive and accurate control can be accomplished if a circuit is used which employs two thyratrons in "back-to-back" connection, or in a "push-pull" circuit, as shown in Figure 7A, instead of the single thyratron 43 of Figure 7. The "push-pull" circuit is shown in more detail in Figure 8, wherein the two thyratrons 45 and 46, respectively conduct alternative half cycles of current if their grids become positive simultaneously with their anodes. This can be accomplished in the manner described above by superimposing a D.C. unbalance signal on a negative bias voltage between grid and cathode. Alternatively, the phase of an A.C. signal voltage may be shifted relative to the A.C. anode voltage in a manner well known in the art, where an A.C. bridge is used. In the latter case, a small A.C. voltage which is opposed in phase to the anode voltage is applied to the grid and prevents the thyratron from conducting as long as the bridge is in balance and does not produce a signal. If the bridge becomes unbalanced due to a change in the flow rate, the balance detector 2 adds a suitably amplified signal voltage, which is in phase with the anode voltage, to the small out of phase bias voltage. The resultant voltage is substantially phased with the anode voltage and therefore "fires" the thyratron, which then conducts every other half cycle. The two thyratrons together therefore supply the heater with pulses of unidirectional current of constant amplitude but in groups of pulses having varying frequencies. This permits very fine and accurate control of the power input to the heater.

The flow meter as above described thus makes use of a triggering action of the power supply to the heater, which may take the form of a direct triggering of the power source by the unbalance signal, or by using a gate between the heat exchanger and the power supply. Figure 9 indicates in block diagram form the type of direct triggering action accomplished by the embodiments shown in Figures 1 through 4. This method is preferred in those cases where the power is of high frequency, e.g. if an induction coil is used as the heat exchanging means for the flowmeter and the power generator 47 contains tubes which can be easily triggered by grid control. Such a generator could very well be the multi-vibrator circuit which produces high frequency currents of square wave shape that are very well suited for induction heating purposes. In this case, the triggering signal from the bridge is injected into the grid circuit of the two resistance coupled triodes and thus effects an on-off control of the multivibrator generator.

I have thus provided a highly efficient and accurate flowmeter for the measuring of fluids in a confined conduit which is operable on either A.C. or D.C., without contamination, without causing a pressure drop or any interference with the free flow of the fluid, which eliminates time lags inherent in, and greatly reduces the power requirement and cost of, prior known instruments.

As used hereinafter, the term "electrical pulses generator means" is intended to include within its scope both the high frequency power source 1 of Figures 1–4, as well as the regulated supply 36 together with the gate 35 of Figures 5–8. Also, as used hereinafter, the term "heat exchanging means" is intended to include within its scope both the induction heating arrangement, i.e. elements 9, 13, 27, of the embodiments of Figures 1–4 as well as the heater coil of the embodiments of Figures 5–8.

Although I have described above certain specific illustrations of my invention it should be understood that many changes may be made that do not depart from the spirit or scope of my invention, which I do not intend to be limited other than by the scope of the following appended claims. It is contemplated as one of such modifications to employ thermocouples or thermopiles as the temperature sensing elements instead of the sensing resistors mentioned hereinabove.

What I claim is:

1. A digitally operating system for detecting the rate of flow of a fluid through a conduit comprising, in combination: an electrical heating means associated with said conduit to transmit heat to the fluid flowing therethrough; an electrical pulse generator means interconnected to intermittently energize said heating means, triggering means for energizing said generator means, said triggering means including a first temperature responsive means located on said conduit and adapted to create a signal responsive to the fluid temperature prior to the transmission of heat thereto and a second temperature responsive means located on said conduit and adapted to create a signal responsive to the fluid temperature after the transmission of heat thereto; comparing circuit means responsive to the difference in signals created by said two temperature responsive means to create a resulting electrical signal; and means coupling said resulting electrical signal to said generator means, said generator means being responsive to said resultant electrical signal to produce a pulse of electrical power for transmission to said heating means, whereby the generated electrical pulses constitute a digital representation of the fluid flow through said conduit.

2. The system of claim 1 wherein said electrical pulse generator is responsive only to the generated resulting signal level exceeding a predetermined value and is unresponsive to the generated resulting signal level below said predetermined value, whereby electrical pulses are transmitted to said heater means sufficient to maintain said resulting signal level at said predetermined level.

3. The system of claim 1 wherein the pulse generator means is an R.F. oscillator including a grid circuit having a bias voltage impressed thereon.

4. The system of claim 3 wherein the R.F. oscillator produces relaxation type oscillations of constant amplitude and including a flow measuring means in parallel with the electrical heating means, comprising, a lamp, a radiation output measuring element and a counter means.

5. The system of claim 3 wherein the R.F. oscillator produces relaxation type oscillations of constant amplitude and constant duration, and including pulse frequency measuring means in parallel with both the heating means and the pulse generator means, said measuring means including in series a rectifier and a condenser, with a leakage resistor in parallel with the condenser.

6. The system of claim 1 wherein the electrical heating means and one of the temperature responsive means are formed as a unitary resistor element of meander shape.

7. The system of claim 1 wherein the electrical heating means and one of the temperature responsive means are formed as a unitary resistor element imprinted upon the inner surface of a portion of the conduit.

8. The system of claim 1 in which the comparing circuit includes an amplifier and the pulse generator means includes a constant voltage supply and a gate, the latter being adapted to reeceive the resulting signal from said amplifier.

9. The apparatus of claim 8 wherein the gate comprises a solenoid relay in series with the voltage supply and operable by the resulting signal to permit pulses of energy to flow to the heater element.

10. The apparatus of claim 8 wherein the gate comprises a negatively biased thyratron in series with the voltage supply and the comparing circuit includes a bridge and a bridge balance detector of the duo-directional type, and wherein a signal from said detector of proper polarity or phase triggers said gate to allow the heating means to be energized with alternative half wave current pulses of constant amplitude.

11. The apparatus of claim 8 wherein the gate comprises a pair of negatively biased thyratrons in back-to-back relationship and the comparing circuit includes a bridge and a bridge balance detector of the duo-directional type, whereby a signal from said detector triggers said gate to allow the heating means to be energized with consecutive half cycles of current.

12. The apparatus of claim 8 wherein the gate comprises a pair of negatively biased thyratrons in push-pull relationship and the comparing circuit includes a bridge and a bridge balance detector of the duo-directional type, whereby a signal from said detector triggers said gate to allow the heating means to be energized with consecutive half cycles of current.

References Cited in the file of this patent

UNITED STATES PATENTS

| | | |
|---|---|---|
| 1,279,626 | Wilson | Sept. 24, 1918 |
| 1,476,762 | Meyer | Dec. 11, 1923 |
| 1,601,513 | Stockle | Sept. 28, 1926 |
| 1,988,294 | Blaich | Jan. 15, 1935 |
| 1,989,828 | Smulski | Feb. 5, 1935 |
| 2,228,844 | Palmer | Jan. 14, 1941 |
| 2,493,575 | Edwards | Jan. 3, 1950 |
| 2,724,271 | Shawhan et al. | Nov. 22, 1955 |
| 2,729,976 | Laub | Jan. 10, 1956 |
| 2,777,325 | Groenhof et al. | Jan. 15, 1957 |
| 2,813,237 | Fluegel et al. | Nov. 12, 1957 |

FOREIGN PATENTS

| | | |
|---|---|---|
| 601,298 | Great Britain | May 3, 1948 |
| 651,152 | Great Britain | Mar. 14, 1951 |